United States Patent
Hofmann et al.

(10) Patent No.: US 7,261,315 B2
(45) Date of Patent: Aug. 28, 2007

(54) ATTACHMENT FOR AN AIRBAG

(75) Inventors: Volker Hofmann, Frankfurt am Main (DE); Gregor Gromodka, Frankfurt am Main (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 324 days.

(21) Appl. No.: 10/940,376

(22) Filed: Sep. 15, 2004

(65) Prior Publication Data

US 2005/0077709 A1    Apr. 14, 2005

(30) Foreign Application Priority Data

Oct. 10, 2003    (DE) ................. 103 47 205

(51) Int. Cl.
*B60R 21/20*    (2006.01)

(52) U.S. Cl. .................... 280/730.2; 280/728.2

(58) Field of Classification Search ............. 280/730.2, 280/728.2
See application file for complete search history.

(56) References Cited

U.S. PATENT DOCUMENTS

| 6,022,044 | A | 2/2000 | Cherry |
| 6,073,961 | A | 6/2000 | Bailey et al. |
| 2001/0052693 | A1 | 12/2001 | Mueller |
| 2002/0096864 | A1* | 7/2002 | Asano et al. ............ 280/730.2 |
| 2002/0190508 | A1 | 12/2002 | Jost |
| 2003/0132620 | A1 | 7/2003 | Kawasaki |
| 2003/0146609 | A1 | 8/2003 | Mueller |

FOREIGN PATENT DOCUMENTS

| DE | 19848794 A1 | 5/1999 |
| DE | 198 41 340 A | 3/2000 |
| DE | 10227316 A1 | 2/2003 |
| EP | 1 241 059 A | 9/2002 |
| EP | 1 422 112 A | 5/2004 |
| GB | 2 309 942 A | 8/1997 |
| JP | 2001-334902 | * 12/2001 |
| JP | 2002 104127 A | 4/2002 |
| WO | WO 03/076235 A1 | 9/2003 |

* cited by examiner

*Primary Examiner*—Ruth Ilan
(74) *Attorney, Agent, or Firm*—Lonnie Drayer

(57) ABSTRACT

An airbag is fastened to a structural member of a motor vehicle. The airbag has at least one strap arranged on a border region of the airbag. The strap has a portal therethrough for receiving a hanger element that is a part of the structural member of the vehicle. The hanger element projects at least partly through the portal in the airbag strap. A fastener is attached to the hanger element, so that the airbag is arranged between the structural member and the fastener. The airbag may have a plurality of straps and the portals are arranged in pairs and the fastener is a handle that extends through the portals arranged in pairs.

6 Claims, 1 Drawing Sheet

ATTACHMENT FOR AN AIRBAG

FIELD OF THE INVENTION

The present invention relates to a method of fastening an airbag to a structural member of a motor vehicle, a motor vehicle, as well as an airbag for a curtain airbag module.

BACKGROUND OF THE INVENTION

Methods for fastening airbags to a structural member of a vehicle are known from the prior art. U.S. Pat. No. 6,073,961 teaches an airbag arranged in a container, fastened to the structural member of a vehicle by a screw. During the deployment of the airbag, the screw protrudes at least partly out of the container, so that the airbag is securely connected to the structural member on the basis of its connection to the container. The problem is that the airbag is connected to the structural member prior to its installation by a hanger element, for instance a container surrounding it. In this manner the airbag is initially to be mounted on this hanger element, then subsequently to be fastened to the vehicle structure. The result is an extremely cost-intensive installation, combined with an increased time for the assembly of the unit comprising the airbag and the fastener.

SUMMARY OF THE INVENTION

The present invention provides a method for fastening an airbag to a structural member a motor vehicle, and an airbag for a curtain airbag module, which ensures a simple, cost-effective and secure mounting of an airbag to a structural member.

According to the invention, a method is provided for fastening an airbag to a structural member of a motor vehicle. An airbag for a curtain airbag module according to the present invention is provided. Next the airbag is arranged on at least one hanger element of the structural member, so that the hanger element projects at least partly through the at least one portal. The method for fastening an airbag to a structural member comprises a further step: the provision of a fastener on the at least one hanger element, so that the airbag is arranged between the structural member and the fastener. The fastener is advantageously used to prevent a sliding down or disengaging of the airbag from the hanger element, wherein the fastener can be part or a region of a handle. In this manner the method or operational safety of an airbag fastened by the present method is increased.

According to another aspect of the invention, a motor vehicle comprises a structural member with at least one hanger element for an airbag and a fastener, wherein the airbag in its fastening region comprises at least one portal, through which the at least one hanger element directly extends. In other words, the airbag comprises in its fastening region, i.e. in the region, in which the airbag is connected to a structural member of a vehicle, at least one portal or opening or hole, through which the at least one hanger element essentially extends without any further intermediary means. In this manner the airbag is brought directly or immediately into engagement with the hanger element, i.e. directly above the airbag material without any further intermediary elements.

According to yet another aspect of the invention, an airbag is provided for a curtain airbag module, wherein the airbag comprises at a fastening region at least one portal and is arranged so that, through the arrangement of a hanger element of a structural member in the portal between the structural member and a fastener, it is secured without additional fastener on the airbag. The airbag is thus designed such that it is brought into engagement with the hanger elements on a structural member merely by its material. Further elements in the region of the portals are thus not required, wherein production times and costs can be significantly reduced.

DETAILED DESCRIPTION OF THE INVENTION

Figure 1:
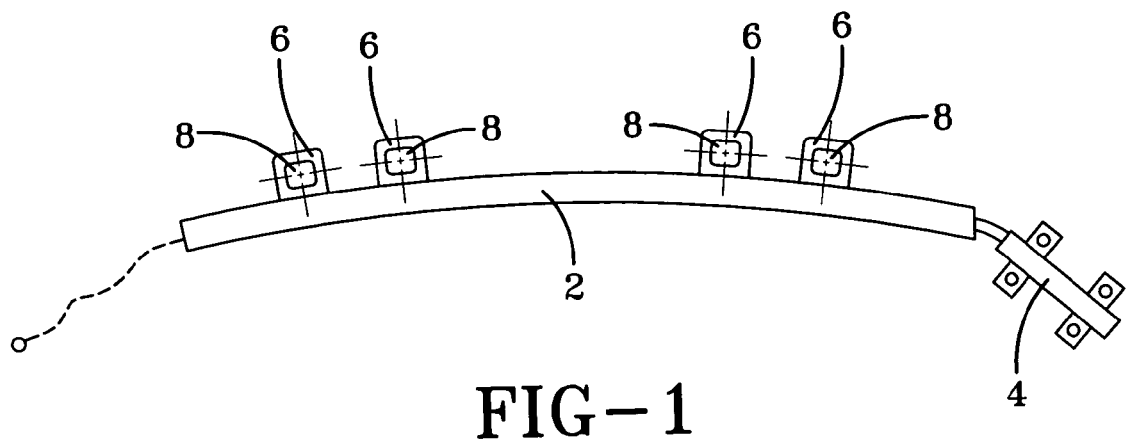
FIG. 1 is a side view of an airbag in a non-inflated state for a preferred embodiment of the method for fastening said airbag to a structural member of a vehicle according to the invention.

An airbag module for a curtain airbag is shown in FIG. 1. An airbag 2 is in a non-inflated state. An inflator 4 is connected to the airbag to supply the airbag 2 with gas during its deployment. During the inflation of the airbag 2, the airbag deploys downwards, e.g. before the side windows of the vehicle. The airbag 2 can be arranged at any other location in a vehicle, e.g. in the region of the dashboard or in the knee or foot region. The airbag 2 can, in accordance with the preferred embodiment, also be used in applications other than in motor vehicles, e.g. in any other vehicles, such as trains or aircraft.

In the fastening regions of the airbag 2, in which the airbag 2 is to be connected with a structural member 12 of the structural member of a vehicle, several straps 6 are located. The fastening region comprises a region of the airbag in which a connection or a fastening to the structural member or an element thereof is located. The straps are made out of essentially the same material as the airbag 2. The fastening regions are presently foreseen along the longitudinal extent of the airbag 2, but can also, or additionally, be arranged on its front sides. The straps 6 can be designed such that two layers of the airbag 2 are stitched and/or glued together in such a manner that in this region cannot be inflated with gas. The straps 6 can also be sewn or welded to the airbag. To increase their strength, the straps 6 can also be folded several times, sewn and/or welded. In addition or alternatively, at least the fastening region can comprise a coating or impregnation with a stiffening compound to increase resistance.

Within the straps 6 are portals 8, through which in an assembled state parts of the structural member of a vehicle or hanger elements 10 for the fastening of the airbag 2 can extend along the latter. The portals 8 are openings of any shape, e.g. rectangular, polygonal or round, preferably adapted so that an at least partly positive locking is achieved with the hanger elements 10. This way it can be avoided that the airbag 2 slips from the hanger elements 10 during installation. Due to a polygonal design of the portals 8 and the hanger elements 10 a twisting of the airbag 2 during installation is avoided. In addition to this, eyelets could be located on the portals 8 to improve their resistance to wear.

Each portal 8 is a hole or opening in the airbag material, made for example by stamping. In other words the airbag does not comprise any additional fastener (i.e. fastener the airbag to or hanging the airbag from the structural member, and which absorb a force during the deployment of the airbag or airbag), but is immediately connected or brought into engagement with the hanger element of the structural member, merely by portals located in the airbag material. According to the invention additional secondary fasteners (e.g. clips, pins, double-sided adhesive tape, etc.) can be foreseen which, despite essentially not absorbing any force during the deployment of the airbag, suitably position the packed airbag or the packed module during the mounting, e.g. for it not to come into contact with a cover (e.g. a vehicle roof lining). The cover contributes to the secure positioning of the airbag, wherein the cover can also be advantageously fastened to the fastener on the vehicle structural member. In this manner a direct connection between the airbag material and the structural member or hanger element is created, so that in the fastening region the airbag material essentially absorbs the forces acting upon the airbag. Due to the immediate arrangement of the airbag to at least one hanger element, an advantageously simple and cost-effective fastening is achieved, since no additional clips, interface structure or other connection elements are necessary and the assembly time is significantly reduced. The immediate arrangement of the airbag to the at least one hanger element is thus carried out by direct contact or connection of the airbag material to the hanger element, so that no further additional elements are required in or on the airbag or airbag material.

The fastener is 14 secured to the side of the hanger element 10 distal from the structural member, to secure the airbag 2 in its position between the structural member and the fastener. By providing a fastener in this position, the airbag can be securely held on the hanger element between the frame or the structural member and the fastener, so that an advantageously operationally safe airbag or airbag is provided.

It is further preferable that the area of the portals 8 is larger than the cross section of the hanger elements 10. In this way the airbag can be assembled on the hanger element by a simple or smooth sliding or pulling over onto the hanger element.

The area of the portals 8 can be smaller or equal to the cross section of the hanger elements 10, so that the portals or the airbag must be tightly slid onto the hanger elements, so that a sufficient preliminary attachment can be ensured.

The straps 6 are arranged on at least one border region of the airbag. In this case the straps are made of the same material as the airbag 2, i.e. they are part of the airbag. As a result, the airbag can be hooked into the present hanger elements with slightly larger, suitable straps without additional fastener. The portals 8 are preferably arranged in accordance with a gripping position. It is thus advantageously possible to arrange the straps 6 and the hanger elements 10 in such a manner that on these one or several handles for the passenger compartment can be fastened by the fastener. The portals 8 are preferably arranged in pairs with the fastening elements 10 extending through the portals arranged in pairs and the fastener 10 is a handle for gripping by a vehicle occupant.

Figure 2:
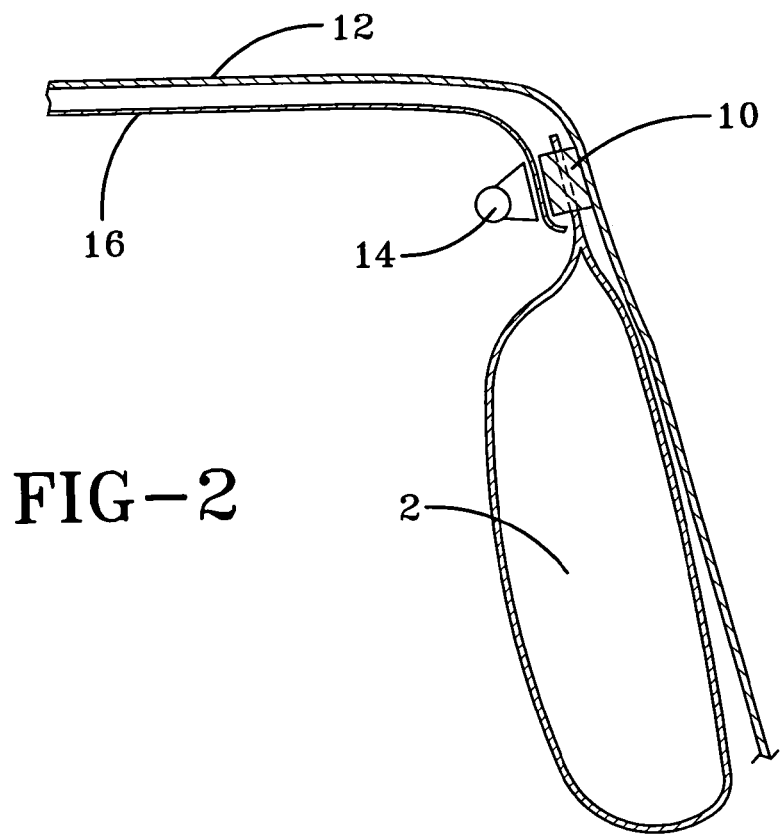
FIG. 2 is a sectional view of a preferred embodiment of the airbag according to the invention in its inflated state, attached to a structural member of a vehicle.

This type of fastening is shown in FIG. 2. Through the portal 8 of the strap in this at least partly deployed airbag 2, a hanger element 10 extends, and is connected with a structural member 12 of a vehicle or is itself a part of the latter. The hanger element 10 preferably has a polygonal cross section that is complementary to, and essentially corresponds to the shape of the portal 8. The hanger element 10 is preferably a fastening block for a handle. In this case the airbag 2, in the region of the portals 8, can be directly or immediately slid onto the hanger element 10 without further fastener, positioned between the airbag 2 and the hanger element 10. Additional secondary fastener (not shown) can be foreseen, ensuring a correct positioning of the packed airbag 2. In contrast to the hanger element 10, these secondary fastener (e.g. clips, pins, adhesive tape) do not absorb any significant forces during the deployment of the airbag 2, but rather are used for the positioning of the airbag 2 in a packed state, e.g. to avoid undesired contact with a cover.

To ensure the positioning of the airbag 2, a fastener 14 is arranged on the side of the hanger element 10 turned away from the structural member 12, to secure the airbag 2 in its position between the structural member 12 and the fastener 14. The fastener 14 preferably extends beyond the hanger element 10, i.e. it extends beyond the cross sectional surface of the hanger element 10 on at least one side. The fastener 14 can be a screw, bolt or rivet, which extends through the hanger element 10 and engages the structural member 12 and preferably comprises at its side turned away from the structural member 12 a (plain) washer to ensure the positioning of the airbag 2. Alternatively the fastener 14 can also be a locking element, which can be locked or brought into engagement with the hanger element 10 and/or the structural member 12. Due to the fastener 14, a casing or cover 16, e.g. a roof lining cover or a dashboard cover, is secured to at least one part of the airbag 2 between the hanger element 10 or the structural member 12 and the fastener 14, so that this also contributes to the positioning and securing of the airbag 2.

It is preferred that the at least one hanger element 10 is essentially hook-shaped and the step of the arrangement of the airbag on the at least one hanger element is carried out by hooking the airbag onto the structural member of the vehicle by placing at least one portal 8 in around the at least one hanger element. In this case the at least one hanger element is essentially shaped like an upwards pointing hook, so that the airbag can be hooked into the hanger elements. In this case the portals on the hanger elements can show a slight allowance on the hanger element, so that a hooking of the airbag can be facilitated, wherein a sufficient preliminary attachment is achieved by the hook-shaped design of the hanger elements.

The step of the immediate arrangement of the airbag to the at least one hanger element of the structural member is carried out by interlocking, that is to say sliding of the airbag or the straps onto the hanger elements. To this effect the hanger element is designed in such a manner that the airbag can be slid onto it in a simple manner, wherein assembly costs can be advantageously reduced. The hanger element can in this case be essentially polygonal. Due to the interlocking, by sliding of the airbag or the portals onto the hanger elements, a sufficient preliminary attachment can be advantageously ensured, since in this case the portals of the airbag are dimensioned in such a manner that they are essentially slid onto the tightening elements in a "tight" manner (i.e. with a slight interference fit).

Due to the direct sliding of the airbag 2 or its portals 8 onto the hanger element 10 without additional third means connected to the airbag 2, an advantageously simple and cost-effective method for fastening an airbag to a structural member of a vehicle can be achieved.

In a further preferred embodiment, the method for fastening an airbag to a structural member comprises the step of arranging a cover between the fastener and at least one part of the airbag. A cover, such as for instance a roof lining cover, can in this case also be fastened to the vehicle structural member by the fastener. In this case a smaller number of or else no additional fastener are required, wherein assembly costs and times can be reduced. In addition, by the cover arranged above the airbag (as seen from the vehicle inside), the latter can also be secured in its position.

It is preferable that the straps 6 are made out of the airbag material. In other words the straps or the region of the portals form an integral part or one unit with the airbag. In a further preferred embodiment, the straps are strengthened by means of seams, welds, glues and/or coatings to improve resistance to wear, so that a tearing of the portals during the deployment of the airbag can be prevented. The fastening region or the straps are preferably indicated by a seam or a glued part in the airbag. In this way a region of the airbag does not inflate with gas during the inflation of the airbag.

Many changes and modifications in the above described embodiment of the invention can, of course, be carried out without departing from the scope thereof. Accordingly, that scope is intended to be limited only by the scope of the appended claims.

We claim:

1. An assembly of a motor vehicle including a structural member having at least one hanger element for an airbag; and an airbag comprising at least one strap arranged on a border region of the airbag, said strap having a portal therethrough for connecting said airbag to said vehicle structural member through the at least one hanger element by extending the strap over the at least one hanger element through the portal such that the airbag is securable wherein the shape of said at least one hanger element and the shape of said portal provide an interlocking of said portal and at least one hanger element for avoiding the slipping of the airbag from the hanger element during installation of the airbag without the use of an additional fastener disposed on the airbag, and a fastener arranged on the side of the hanger element turned away from the structural member, to secure the airbag in its position between the structural member and the fastener; and a cover that is arranged between the fastener and at least one part of the airbag.

2. The meter-vehicle assembly according to claim 1, wherein the size of the portal is smaller or equal to the cross section of the at least one hanger element.

3. The assembly according to claim 1, wherein the airbag has a plurality of straps and wherein the portals are arranged in pairs and the fastener is a handle that extends through the portals arranged in pairs.

4. A method of fastening an airbag to a structural member of a vehicle comprising the steps of:
providing a vehicle having a structural member with at least one hanger element for an airbag, the hanger element having a fastener thereon;
providing a side curtain airbag module an airbag comprising at least one strap arranged on a border region of the airbag, said at least one strap each having a portal therethrough for receiving a hanger element therethrough; and
making a preliminary assembly of the airbag and said at least one hanger element of the structural member, so that the airbag is arranged between the structural member and the fastener and the at least one hanger member projects at least partly through the at least one portal to provide an interlocking of said portal and said at least one hanger element for avoiding the slipping of the airbag from the hanger element during installation of the airbag without the use of an additional fastener disposed on the airbag.

5. The method for fastening an airbag to a structural member of a vehicle according to claim 4, wherein the step of making a preliminary assembly of the airbag and said at least one hanger element is carried out by sliding at least one of the airbag straps onto the hanger element.

6. The method for fastening an airbag to a structural member of a vehicle according to claim 4, further comprising the step of arranging a cover between the fastener and at least one part of the airbag.

* * * * *